United States Patent [19]

Junker

[11] 4,345,495
[45] Aug. 24, 1982

[54] LATHE DOG

[76] Inventor: Erwin Junker, Talstrasse 78, D 7611 Nordrach-Baden, Fed. Rep. of Germany

[21] Appl. No.: 169,197

[22] Filed: Jul. 15, 1980

[30] Foreign Application Priority Data

Oct. 19, 1979 [DE] Fed. Rep. of Germany ....... 2942351

[51] Int. Cl.³ ............................................. B23B 33/00
[52] U.S. Cl. ............................................. 82/41; 82/45
[58] Field of Search ........................... 82/40 R, 41, 45

[56] References Cited

U.S. PATENT DOCUMENTS

| | | | |
|---|---|---|---|
| 418,464 | 12/1889 | Holmes | 82/41 |
| 1,336,548 | 4/1920 | Amundsen | 82/40 R |
| 2,371,934 | 3/1945 | St. Marie | 82/40 R |

FOREIGN PATENT DOCUMENTS

| | | | |
|---|---|---|---|
| 503018 | 3/1939 | United Kingdom | 82/40 R |
| 549283 | 11/1942 | United Kingdom | 82/40 R |
| 643242 | 9/1950 | United Kingdom | 82/40 R |

*Primary Examiner*—Leonidas Vlachos
*Attorney, Agent, or Firm*—Wenderoth, Lind & Ponack

[57] ABSTRACT

A lathe dog has a floating pendulum disc (D) held in a rotatable holder (H) associated with one center point (B) for a workpiece (A). Such holding is shown to be in a slot (G) by an extension finger (K) engaging spherical contacts (G'). The disc (D) has a central interiorly conical (F', F'') carrier (F) to engage on and be pressed (springs E) against the workpiece (A) and permit tilting thereof.

6 Claims, 5 Drawing Figures

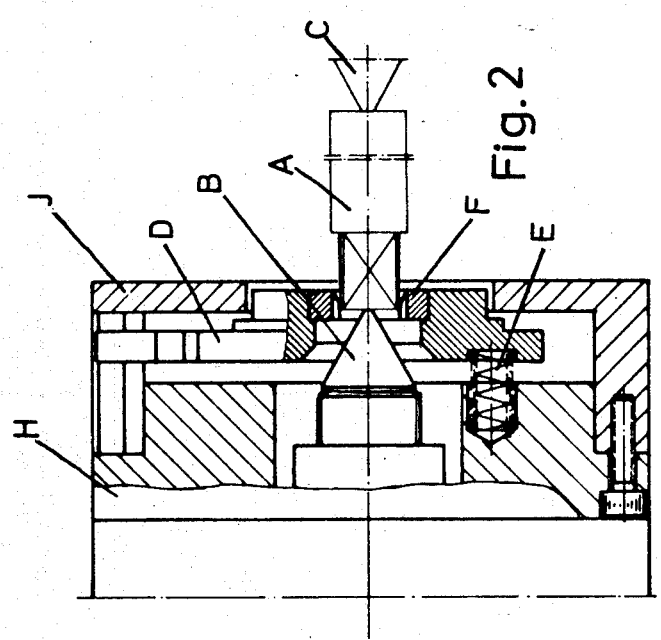
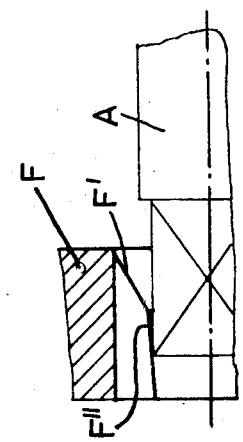
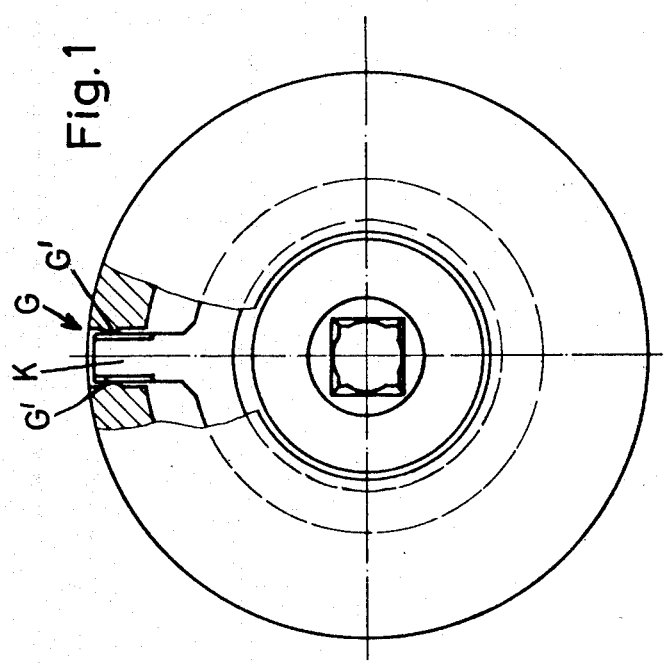

LATHE DOG

BACKGROUND OF THE INVENTION

The invention relates to a lathe dog for workpieces clamped between points of a lathe.

In DE-AS No. 17 52 924 a lathe dog is described in which two gripping levers rotatably mounted on a carrier disc take hold of the article to be gripped and are prestressed towards their locking position. A particular expanding device is required in order to enable release of the levers to change the workpiece.

SUMMARY OF THE INVENTION

It is an object of the invention to provide a lathe dog that does not need such an expanding device, with which workpieces can be precisely and positively held and rotated free from play about their own axes, also when their outer contours may be produced tapered through lateral displacement of a centering receiver.

According to the invention a lathe dog comprises a floating pendulum disc held substantially free of play and torsion by a rotatable center point assembly, the disc having an interiorly conical carrier that is pressed to engage a workpiece clamped between two workpiece center points of the lathe.

Preferably the carrier disc has progressively less convergent conical inner surfaces and fits by its outer contour substantially exactly into a corresponding recess in the pendulum disc.

With advantage, a carrier finger extension of the pendulum disc is guided between two spherically shaped contact surfaces of the rotatable body of the assembly.

Preferably, compression springs are provided between the pendulum disc and the body.

Preferred embodiments of this invention provide a lathe dog that holds the clamped workpiece rigidly in the carrier disc, but offers a choice of planes for its disposition and the carrier disc together with the workpiece without application from the exterior of disadvantageous forces on the clamping of the workpiece. At the same time, the carrier disc and therewith the workpiece can operate free from play in the appropriate direction of rotation, and also, on reversal of the direction of rotation, a torsion stiff locking-in is ensured by the close-fitting of the carrier finger extension. Also, such lathe dogs are not expensive and are adaptable without difficulty to already existing machine structures.

BRIEF DESCRIPTION OF THE DRAWINGS

One embodiment of the invention will now be described, by way of example, with reference to the accompanying drawings, in which:

FIG. 1 is a partially sectioned front view;

FIG. 2 is a vertical section through FIG. 1;

FIG. 3 is a sectional part view of the lathe dog of FIG. 2; and

DETAILED DESCRIPTION OF THE INVENTION

In the arrangement of lathe dog and rotatable center point assembly shown from the front in FIG. 1, a carrier finger extension K of a floatingly mounted pendulum disc is shown, located guidingly between two spherically shaped or rounded contact surfaces G' of a rotatable chuck base body.

Turning to the sectional view of FIG. 2, a workpiece A shown with break lines is center clamped between points B, C secured axially rigidly in the machine frame structure not illustrated.

A pendulum disc D is biassed by springs E and pressed axially against the rigidly clamped workpiece via a conically shaped carrier disc F rigidly mounted in the pendulum disc. The pendulum disc D is held, free from play and free from friction, radially at the position G (see FIG. 1). If the chuck base body H is rotated, the workpiece is driven, through the contact surface G, the pendulum disc D, and the carrier disc F shaped correspondingly to the workpiece, and is free from play in the appropriate direction of rotation.

Reversal of the direction of rotation is also free from play by virtue of the illustrated location of the carrier finger, and the workpiece A remains locked-in, and rigid against torsion.

Figure 4:
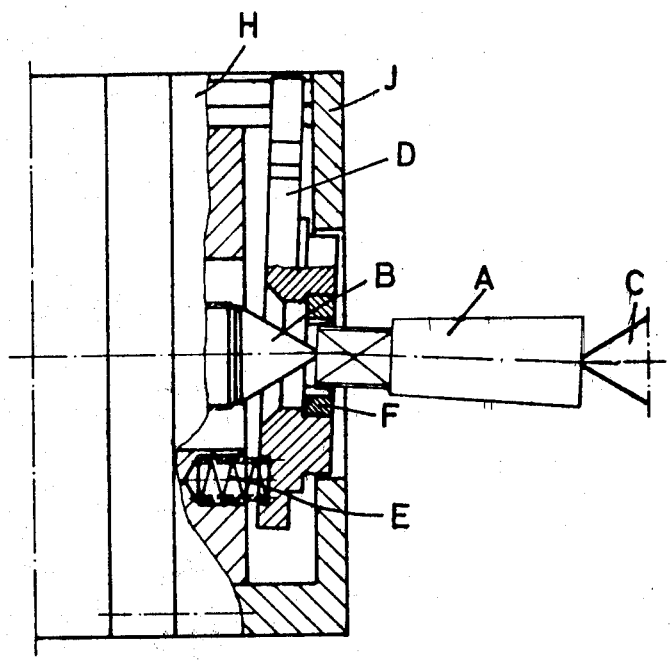
FIGS. 4 and 5 are partial sections of the arrangement of FIG. 2 in different operative positions.
Figure 5:
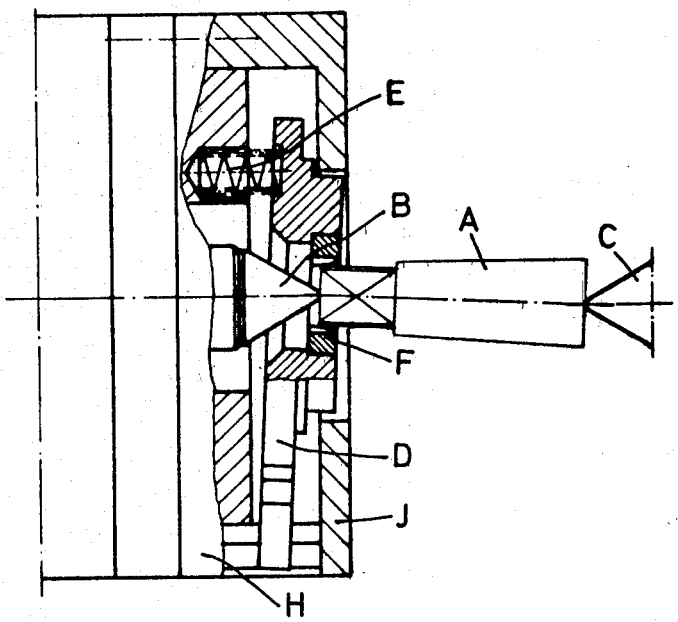

If the center points are laterally displaced to service a tapered workpiece, drive of the workpiece remains free from flexural torque, since the carrier finger of the pendulum disc D can move substantially free from friction at the position G. These operational conditions are illustrated in FIGS. 4 and 5.

The contact surfaces of the carrier finger with the chuck base body are formed as spherical shapes at the position G, so that substantially point contact results and ensures rotary locking-in free from play, of the workpiece even at reversal of the direction of rotation.

FIG. 3 shows an enlarged sectional view of the carrier disc F, which has two successively less convergent conical inner surfaces F' and F''. This materially aids clamping to the workpiece at different inclinations corresponding to possible planes of the pendulum disc and without effecting ease of workpiece movement. In particular, the workpiece may not trail on rotation of the carrier disc.

The indicated arrangement is readily made and can be incorporated in existing lathes.

I claim:

1. In a lathe structure of the type including a pair of tapered center points for clamping therebetween a workpiece, a rotatable chuck base body, and a lathe dog for clamping the workpiece and for transferring thereto rotation of said chuck base body, the improvement wherein said lathe dog comprises:

a pendulum disc mounted on said chuck base body for rotation therewith;

means for mounting said pendulum disc on said chuck base body to prevent relative rotation therebetween in either of opposite directions of rotation of said chuck base body about the axis of rotation thereof, and to allow relative axial movement and relative tilting movement of said pendulum disc with respect to said chuck base body;

a carrier disc connected to said pendulum disc for movement therewith, said carrier disc having therethrough an opening with internal axially inclined surfaces for contacting an end of the workpiece;

one of said center points extending into said opening; and means operable between said chuck base body and said pendulum disc for urging said pendulum disc and said carrier disc toward the workpiece in the direction of a straight line extending between the contact points of said center points with the workpiece, and thereby for urging said inclined surfaces of said carrier disc into clamping contact with the workpiece.

2. The improvement claimed in claim 1, wherein said carrier disc tightly fits into a recess in said pendulum disc.

3. The improvement claimed in claim 1, wherein said inclined surfaces include first and second surfaces which are axially spaced and axially inclined by different amounts of inclination.

4. The improvement claimed in claim 1, wherein said mounting means comprises a radial recess in said chuck base body, and a radial extension of said pendulum disc, said extension fitting in said recess.

5. The improvement claimed in claim 4, wherein said recess has rounded lateral contact surfaces in contact with edge surfaces of said extension.

6. The improvement claimed in claim 1, wherein said urging means comprise a plurality of compression springs circumferentially spaced about said axis of rotation.

* * * * *